(12) United States Patent
Lugscheider et al.

(10) Patent No.: US 7,041,180 B2
(45) Date of Patent: May 9, 2006

(54) METHOD FOR JOINING WORKPIECES USING SOLDERING ALLOY

(75) Inventors: Erich Lugscheider, Aachen (DE); Wolfgang Tillmann, Nüziders (AT); Hongshou Zhuang, Beijing (CN)

(73) Assignee: Materials Resources International, Lansdale, PA (US)

( * ) Notice: Subject to any disclaimer, the term of this patent is extended or adjusted under 35 U.S.C. 154(b) by 421 days.

(21) Appl. No.: 10/123,355

(22) Filed: Apr. 16, 2002

(65) Prior Publication Data

US 2002/0121541 A1    Sep. 5, 2002

Related U.S. Application Data

(62) Division of application No. 09/850,613, filed on May 7, 2001, now abandoned, which is a division of application No. 08/983,472, filed as application No. PCT/EP96/03037 on Jul. 11, 1996, now Pat. No. 6,231,693.

(30) Foreign Application Priority Data

Jul. 15, 1995    (DE)    ................. 195 26 822

(51) Int. Cl.
B23K 35/26    (2006.01)

(52) U.S. Cl. ................. 148/516; 148/442; 148/400; 420/558; 420/570; 420/589; 228/121; 228/123.1

(58) Field of Classification Search ................. 148/442, 148/400, 516; 420/558, 570, 589; 228/121, 228/123.1
See application file for complete search history.

(56) References Cited

U.S. PATENT DOCUMENTS 5,184,399 A * 2/1993 Ueno et al. ................. 29/846
6,319,617 B1 11/2001 Jin et al.

FOREIGN PATENT DOCUMENTS

| AT | 193 612 | 11/1957 |
|---|---|---|
| DE | 809 972 | 8/1951 |
| DE | 1 128 672 | 4/1962 |
| DE | 2 235 376 | 2/1974 |
| EP | 0 235 546 | 9/1987 |
| EP | 0 652 072 | 5/1995 |
| JP | 3128192 | 5/1991 |

OTHER PUBLICATIONS

German Search Report dated Nov. 12, 1996.
A. P. Xian, "Precursor film in a metal-ceramic wetting system," Welding In The World, vol. 30, No. 9/10, Sep. 1, 1992, pp. 243-251.
Soldering Manual, American Welding Society, Inc., selected pp. (2nd ed. 1977).
Kapoor et al., "Tin-Based Reactive Solders for Ceramic/Metal Joints," Metallurgical Transactions B, vol. 20B, pp. 919-924 (Dec. 1989).
Hayduk, Jr., "Effect of Atmosphere Composition on Metallizing $Al_2O_3$ Substrates with Mo-Mn Paste," Reprinted from Solid State Technology (Apr. 1985).
J. Intrater, "Review of Some Processes For Ceramic-To-Metal Joining," Materials & Manufacturing Processes, 8(3), pp. 353-373 (1993).
Baudrand, "Electroless Nickel Plating On Metallized Ceramic," Reprinted from Plating Finishing (Sep. 1981).
"Standard Specification for Metalized Surfaces on Ceramic," Annual Book of ASTM Standards, Part II, (Reapproved 1978).
Brazing Handbook, American Welding Society, Inc., pp. 411-422 (4th ed. 1991).

* cited by examiner

*Primary Examiner*—Sikyin Ip
(74) *Attorney, Agent, or Firm*—Stradley Ronon Stevens & Young, LLP

(57) ABSTRACT

A method of joining workpieces using a solder alloy. The alloy contains either at least 1% or a maximum of about 10% by weight of an element or a mixture of elements selected from the group consisting of titanium, zirconium, hafnium, vanadium, niobium, and tantalum; either at least 0.01% or 0.01–10% by weight of an element or a mixture of elements selected from the group of the lanthanides (rare earths); either at least 0.5% or 0.5–10% by weight of an element or a mixture of elements selected from the group consisting of silver, copper, and indium; optionally either at least 0.01% or 0.01–1% by weight of gallium; and a remainder consisting of tin, lead, or of a mixture of tin and lead.

9 Claims, No Drawings

METHOD FOR JOINING WORKPIECES USING SOLDERING ALLOY

This application is a divisional of U.S. patent application Ser. No. 09/850,613, filed on May 7, 2001 (abandoned), which is a divisional of U.S. patent application Ser. No. 08/983,472, filed on Apr. 23, 1998 (issued as U.S. Pat. No. 6,231,693), which is the U.S. National Phase application of PCT International Application No. PCT/EP96/03037 filed Jul. 11, 1996.

The invention relates to an alloy, in particular a solder alloy, to a method for joining workpieces by soldering by means of a solder alloy, and to the use of an alloy for soldering.

Soldering is one of the most widely used joining techniques. Even wider use of soldering for joining workpieces has hitherto still been faced with some drawbacks.

Solder alloys known hitherto can be used successfully only if the surfaces of the workpieces to be joined are cleaned prior to application of the solder and are freed from any oxide layers present, to ensure good contact of the solder with the workpiece surfaces, and/or if a flux is used at the same time as the solder. This means that the workpiece surfaces to be soldered require a complicated pretreatment and/or that the soldering operation involves a more complex procedure owing to the use of added flux. Furthermore there is the risk that after the soldering operation flux residues will remain on the soldered workpieces, which may lead to problems in further processing steps or which may impair the long-term durability of the soldered joints. Finally, some of the fluxes used are hazardous to health and/or the environment.

Known commercial soft solder alloys which comprise tin and/or lead and possibly silver and which can be processed at about 200° C. have the further drawback that they will wet many materials either not at all or only very poorly and that they cannot be used for joining workpieces having surfaces of such poorly wettable or entirely nonwettable materials. Such conventional soft solders cannot be used, for example, to solder work-pieces of ceramic materials, since ceramic surfaces are not wetted.

There have been previous attempts to overcome this drawback by admixing the soft solders with titanium. These so-called activated soft solders with a proportion of titanium as the so-called active metal exhibit significantly improved wetting even of surfaces which per se are poorly wettable, for example ceramics. A serious drawback of these activated soft solders, however, is that they require process temperatures of from 600 to 900° C. and can be processed only in a high vacuum or in a pure shielding gas. The need for processing under vacuum makes the soldering operation very complex; in many cases their use is entirely out of the question. Furthermore, the high processing temperature severely limits the choice of solderable materials.

In addition, for certain special cases, the method of eutectic copper bonding is known, but this is even more expensive and complicated.

It is therefore an object of the invention to propose an alloy, in particular a solder alloy, and a method for joining workpieces by soldering by means of a solder alloy, which method enables more versatile applicability of the soft-solder technique. In particular it is an object of the invention to propose an alloy, in particular a solder alloy, which can be processed even in oxygen-containing atmospheres such as, for example, in air, has a relatively low processing temperature and will wet even surfaces which per se are poorly wettable, such as ceramic surfaces, for example. In a further improvement of the invention, the solder alloy to be proposed should be amenable to processing without a flux.

The object is achieved by a novel alloy, in particular a solder alloy, by a method for joining workpieces by soldering by means of said novel solder alloy and by the use of this novel alloy for soldering. The novel alloy is characterized in that it comprises

- at least 1% by weight of an element or a mixture of elements of subgroup IVa and/or Va of the Periodic Table of the Elements,
- at least 0.01% by weight of an element or a mixture of elements of the lanthanide group,
- optionally at least 0.5% by weight of silver or copper or indium or a mixture of silver and/or copper and/or indium and
- optionally at least 3.01% by weight of gallium
- and the remainder consists of tin or lead or of a mixture of tin and lead
- and possibly of the usual impurities.

The proposed alloy therefore consists of at least three components, i.e. a first component which consists of an element or a mixture of elements of subgroup IVa and/or Va of the Periodic Table of the Elements; a second component which consists of an element or a mixture of elements of the lanthanide group; and of a third remainder component, which consists of tin or lead or of a mixture of tin and lead.

Preferably the alloy according to the invention additionally comprises a further component which consists of silver or copper or indium or a mixture of silver and/or copper and/or indium; and/or another further component which consists of gallium. The fourth and possibly fifth component are advantageously present in the novel alloy, but are not absolutely necessary to achieve the advantages according to the invention.

The elements of subgroup IVa and/or Va of the Periodic Table of the Elements include, inter alia, the elements titanium, zirconium, hafnium, vanadium, niobium and tantalum, of which titanium is preferred. The elements of the lanthanide group include inter alia cerium, praseodymium, neodymium, gadolinium and ytterbium, of which cerium is preferred.

The function of the individual alloy components can be described as follows:

- The third remainder component comprising tin or lead or a mixture of tin or lead is a conventional solder base.
- The first component, which consists of an element or of a mixture of elements of subgroup IVa and/or Va of the Periodic Table of the Elements, in particular of titanium, increases the wetting power of the alloy, in particular for ceramic surfaces. It further serves to reduce the surface tension of the alloy in the molten state.
- The second component, which consists of an element or of a mixture of elements of the lanthanide group, in particular cerium, prevents, owing to its high affinity to oxygen, the oxidation of the first component which, in particular, consists of titanium. Owing to the high affinity to oxygen, oxygen from the environment, from oxide layers of the materials to be joined or from other sources will preferentially form compounds with the cerium and not with the titanium, so that the titanium will remain, at least largely, in nonoxidized form and will we able to deploy its positive effects.

Alloys having the novel composition can be used to join a multiplicity of metallic and nonmetallic materials, even oxidic and nonoxidic ceramic materials, to themselves or to other materials. Joining by soldering can advantageously be carried out in an oxygen-containing atmosphere, for example in air. Furthermore, in general it is not necessary to use a flux.

The processing temperature of the alloy according to the invention is preferably at most 500° C., in particular between 200 and 450° C. By means of the addition of further components such as the above-mentioned silver and/or copper and/or indium and/or gallium it can be tailored to the value desired for each particular application.

In contrast to the known, so-called activated soft solders, the processing temperatures of an alloy according to the invention are therefore drastically reduced. Furthermore, it is not necessary to use a vacuum or a shielding gas atmosphere to carry out the soldering operation.

The joining mechanism is based on:
the removal, by reactive alloy components, of any oxide coatings present on the surfaces of the workpieces to be joined;
the reduction of the surface tension in the molten state as a result of interactions of the alloy components with the surrounding media and
attachment via physical forces.

Solder alloys according to the invention are readily usable in a wide variety of sectors under a wide variety of processing conditions. They can be employed, for example, for producing soldered joints, without difficulty, between copper and steel or cast iron-carbon alloys. They also make it possible to solder copper onto a silicon workpiece, for example a semiconductor wafer. Alloys according to the invention therefore find numerous applications in semiconductor electronics, both in microelectronics and in the power electronics sector.

As well as the option of, for example, soldering a copper sheet to a silicon wafer, there is also, for example, the option of joining, by soldering, a workpiece made of copper and a workpiece made of aluminum nitride. Aluminum nitride is a good insulator whose insulating characteristics are comparable to those of the widely used insulator aluminum oxide, but which has a distinctly higher thermal conductivity than aluminum oxide. A solder alloy according to the invention can therefore be used for producing a joint having very good thermal conductivity between a power semiconductor and an aluminum nitride workpiece which dissipates the lost heat of the power semiconductor element into a base, while at the same time the aluminum nitride workpiece ensures electrical insulation with respect to the base.

Another possible procedure, for example, is to solder a copper sheet by means of an alloy according to the invention onto a support made of silicon, aluminum nitride or fiber-reinforced carbon. Subsequently, further metallic components can be soldered to this copper sheet in a known manner by means of known, commercial solders.

A solder alloy according to the invention can also be used to join by soldering, aluminum workpieces to one another or to copper or steel components or components made of cast iron-carbon alloys such as cast iron or cast steel. This can advantageously be used, for example, in plumbing technology, e.g. for joining components during the construction or repair of coolers or heat exchangers or for fitting temperature sensors, ensuring good thermal conductivity, in heating and hot-water installations.

Solder alloys according to the invention can be prepared and used in a wide variety of forms, for example as wires, rods, sheets, granules, powders, pastes, foils or moldings. Solder pastes are known as so-called metallization, thick-film or screen-printing solder pastes and can be applied to printed circuits via the screen-printing method.

Suitable for heating an alloy according to the invention are all the known heating methods, for example heating by means of a soldering iron or flame, plate heating, hot-air heating, ultrasonic heating or resistance heating. Solder alloys according to the invention can also be used in the reflow or flow-solder method.

The solder temperature can be influenced by the addition of the further component(s) which, according to the invention, can optionally be used in addition, these being silver, copper, indium or gallium. It can also be influenced by the choice of remainder component, i.e. tin or lead or a mixture of lead and tin. Whereas the processing temperature in the case of novel tin solders, whose remainder component consists at least predominantly of tin, is generally between 220 and 350°, the soldering temperature of lead solders according to the invention, whose remainder component consists at least predominantly of lead, is generally between 320 and 450° C.

Further advantageous refinements of the invention are addressed in the subordinate claims.

As state, solder alloys according to the invention have a number of important advantages compared with the prior art. The most important aspects to be mentioned are that solder alloys according to the invention can be processed even without a flux in any ambient atmosphere, have a relatively low processing temperature and can be used even on surfaces which per se are very poorly wettable. At the same time, their manufacture is no more expensive or hardly more expensive than that of known solder alloys, for example the so-called activated soft solders. In addition to the applications where solder joints are used even today for joining workpieces, they will e.g. be suitable for advantageous use in many sectors, where adhesive joints had hitherto been used.

The alloy according to the invention, in particular solder alloy, the method according to the invention and the use, according to the invention, of the alloy are explained below in more detail with reference to a working example.

To establish a soldered joint between a copper plate and an aluminum nitrite plate, the copper plate is first arranged on an electric hot plate. On top of the copper plate, which does not require any special preparation, for example pre-cleaning or prepolishing, a foil made of a solder alloy according to the invention is placed. The rolled foil consists of an alloy comprising 7% by weight of silver, 2% by weight of copper, 4% by weight of titanium, 0.1% by weight of cerium, 0.05% by weight of gallium, the remainder being tin. The aluminum nitride plate is then placed on top of the foil. Then a mechanical compressive force is exerted on the stacked plates in the direction of the hot plate, for example by a metal weight being placed on top of the stacked plates.

If the hot plate is then heated by the hot plate heater being switched on, the stacked plates warm up. With this specific embodiment of an alloy according to the invention the soldering temperature is about 350° C., the soldering time a few minutes. After the solder alloy foil has melted, the stacked plates are allowed to cool again, by the hot plate being switched off, so that the molten solder upon solidification rigidly joins the copper plate and the aluminum nitride plate. To form the joint, preference is given—as in this working example—to the use of an additional mechanical support for the molten solder, to ensure even flow of the solder. Preferably, cooling of the stacked plates takes place relatively slowly when—as in this working example—materials having markedly different thermal expansion coefficients are to be joined together by soldering, since otherwise, in the event of unduly rapid and especially nonuniform cooling, cracking might occur.

The soldering method described can also be carried out with other solder alloys according to the invention. A solder alloy according to the invention comprising 4% by weight of silver, 4% by weight of titanium, 0.1% by weight of cerium, 0.1% of gallium, the remainder being tin, can e.g. likewise be processed at 350° C., whereas a solder alloy according to the invention, comprising 4% by weight of silver, 2% by weight of titanium, 2% by weight of tin, 2% by weight of indium, 0.1% by weight of cerium, 0.05% by weight of gallium, the remainder being lead, is processed at 400° C.

As well as the soldering method described, any other soldering method known to those skilled in the art can be implemented using a solder alloy according to the invention, any optimization of the composition within the scope of the claims with a view to the desired application being readily established experimentally by those skilled in the art.

The invention claimed is:

1. A method for joining workpieces by soldering, the method comprising the steps of:

providing a solder alloy consisting essentially of 1–10% by weight of an element or a mixture of elements selected from the group consisting of titanium, zirconium, hafnium, vanadium niobium and tantalum, 0.01–1% by weight of an element or a mixture of elements selected from the group of lanthanides (rare earths), 0.5–10% by weight of an element or a mixture of elements selected from the group consisting of silver, copper and indium, 0.01–1% by weight of gallium, and a remainder of tin, lead or of a mixture of tin and lead;

providing a first workpiece and a second workpiece to be joined; and applying the solder alloy to join the first workpiece to the second workpiece.

2. The method according to claim 1 wherein the solder alloy is applied in an oxygen-containing atmosphere.

3. The method according to claim 2 wherein the solder alloy is applied in air.

4. The method according to claim 1 wherein the solder alloy is applied at a solder temperature of at most 500° C.

5. The method according to claim 4 wherein the solder alloy is applied at a solder temperature of 200–450° C.

6. The method according to claim 1 wherein the solder alloy is applied without the use of a flux.

7. The method according to claim 1 wherein the solder joint surface of at least one of the workpieces to be joined is a nonmetallic material.

8. The method according to claim 7 wherein the nonmetallic material is selected from the group consisting of aluminum nitride, silicon, and fiber reinforced carbon.

9. The method according to claim 8 wherein the nonmetallic material is selected from the group consisting of an oxidic ceramic material and a non oxidic ceramic material.

* * * * *